Patented May 30, 1933

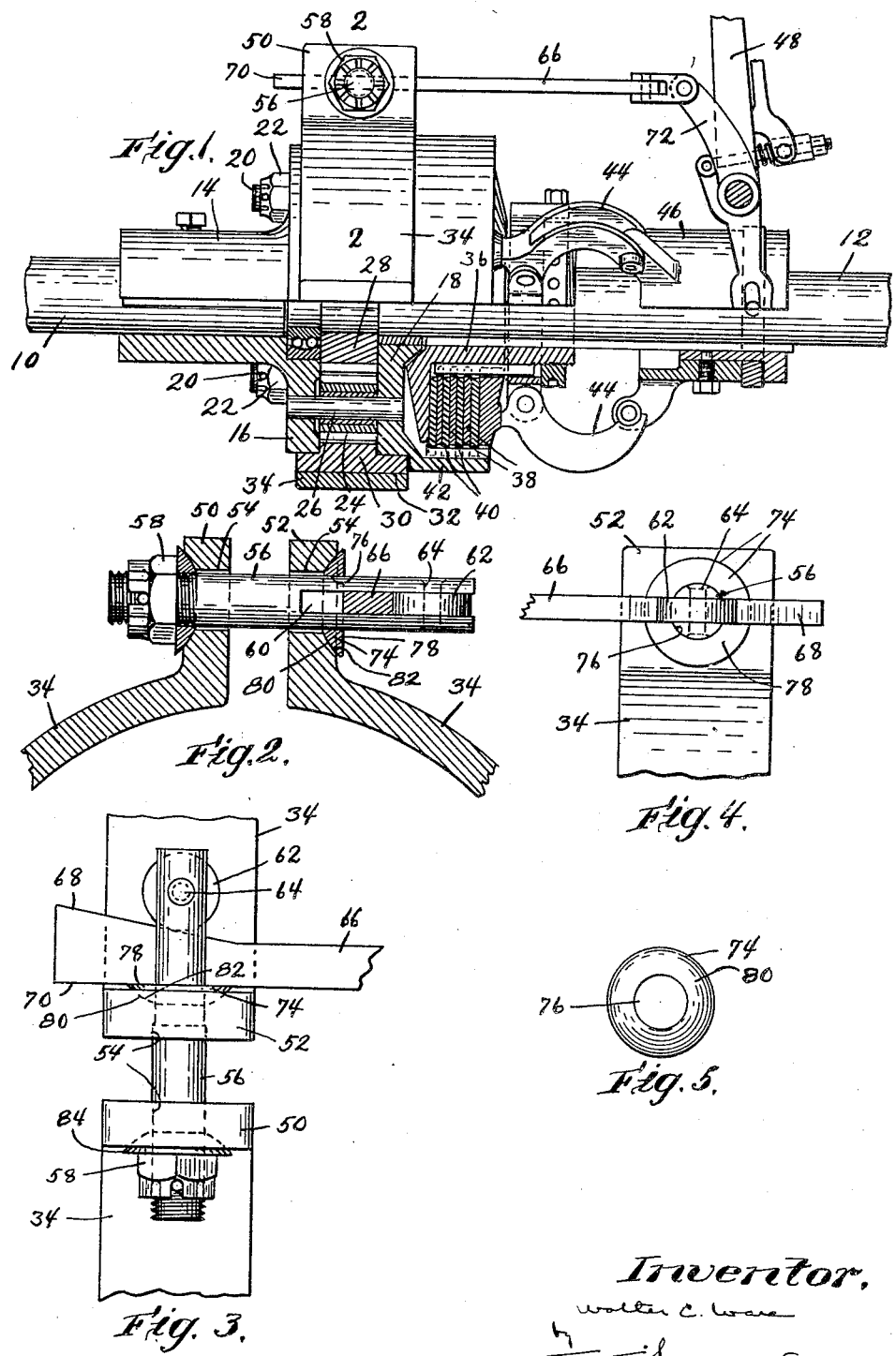

1,912,026

UNITED STATES PATENT OFFICE

WALTER C. WARE, OF TAUNTON, MASSACHUSETTS, ASSIGNOR TO EVANS STAMPING AND PLATING COMPANY, OF TAUNTON, MASSACHUSETTS, A CORPORATION OF MASSACHUSETTS

BRAKE MECHANISM FOR REVERSING GEARING

Application filed April 1, 1929. Serial No. 351,596.

This invention relates to reversing mechanisms and particularly to a brake mechanism adapted to set the reversing mechanism for reverse drive.

Reversing mechanism of the planetary gearing type usually includes a rotatable element constituting a brake drum, and a brake band which encircles the drum and is adapted to engage the brake drum and hold it stationary and thereby condition the reversing mechanism for reverse drive. The brake band usually is flexible and has spaced confronting ends which are adapted to be drawn together to contract the brake band about the drum. The mechanism for contracting the brake band usually includes a horizontal bar or rod which is movable lengthwise and axially of the gearing and has a cam face that engages components of the confronting ends of the brake band upon longitudinal movement of the bar to effect the contraction of the brake band. Due to the contracting movement, and also to the lengthwise movement of the bar, the ends of the band assume various positions relative to each other and to the bar, depending upon the various forces acting upon them and also upon wear. Consequently, the engagement of the cam bar with the confronting ends of the brake band is not as satisfactory as may be desired.

An object of the present invention is the provision of brake mechanism for the type of reversing mechanism above set forth wherein the cam rod or bar has a broad seat upon one of the ends of the brake band regardless of any change that may take place in the relative positions of the brake band and cam bar under the usual conditions of operation and wear.

A further object of the invention is the provision of a contractile brake band having confronting ends, a rod carried by one of the ends of the brake band and extended through the other end, and a cam bar movable longitudinally of the mechanism having a tapered or cam face which engages the aforesaid rod and a flat face that has a universal seat upon the other end of the brake band, whereby the bar and the ends of the brake band can assume other than parallel positions with respect to each other without effecting the flat seat of the cam bar on the band.

A further object is generally to improve the construction and operation of reversing mechanisms and brake mechanisms therefor.

Fig. 1 is a side elevation, partly in section, of a reversing mechanism embodying the present invention.

Fig. 2 is a sectional detail along line 2—2 of Fig. 1.

Fig. 3 is a partial plan view of the mechanism of Fig. 1.

Fig. 4 is a side elevation of Fig. 2.

Fig. 5 is a plan view of the self-seating pressure disc of Figs. 2, 3 and 4.

The reversing mechanism or gearing herein shown is substantially as illustrated in the Henry A. Tuttle Patent No. 1,694,295, dated December 4, 1928. This gearing is merely chosen to illustrate the invention; and the invention is applicable to other reversing gearings and brake mechanisms as well.

The reversing gearing here shown includes the driving shaft 10 and the driven shaft 12 which are arranged in axial alignment. A hub 14 is secured to the driving shaft and has a radially outstanding wall or plate 16 integral therewith. A second wall or plate 18 encircles the driven shaft and is located in axially-spaced parallel relation with said plate 16 and is secured rigidly and detachably therewith by the bolts 20 and nuts 22. The walls 16 and 18 constitute a carrier for the pinion gears 24 of the planetary gearing mechanism. Said gears are located between said walls 16 and 18 and are journalled upon pins 26 carried by said walls. A spur gear 28 is fixed to the driven shaft 12 and is in mesh with said pinion gears 24. A floating internal gear 30 surrounds said pinion gears 26 and is in mesh therewith. Said internal gear is supported rotatably upon the outer cylindrical faces of said walls 16 and 18. The outer face 32 of said internal gear is cylindrical and said gear constitutes a brake drum which is encircled and is adapted to be engaged by a brake band 34 to hold the internal gear stationary to set the gearing for reverse drive.

Clutch mechanism is provided to connect the driving and driven shafts directly whereby to set the gearing for forward drive. Said clutch mechanism includes a hub 36 which is keyed to and is slidable on the driven shaft and carries a set of clutch plates 38. Said clutch plates are adapted to be engaged by a second set of clutch plates 40 carried by a cylindrical wall 42 which is integral with the wall 18. Clutch operating mechanism including links 44 is arranged to press said plates together, whereby to connect the two shafts directly. Said links are pivoted to a sleeve 46 that is keyed to and is slidable on the driven shaft 12 and is adapted to be moved axially in opposite directions in setting the gearing both for forward and reverse drive. An operating handle 48 is arranged to actuate the mechanism and also to move the sleeve 46.

The brake band 34, in connection with which this invention more particularly relates, is resilient and is adapted to be contracted about the brake drum or internal gear 30 to set the gearing for reverse drive. The brake band has spaced confronting ends at the top of the gearing which are provided with spaced upstanding lugs or ears 50 and 52 respectively which usually are integral with said band. Said lugs are provided with aligned passages 54 therethrough through which a cylindrical rod 56 is extended. Said rod is screw threaded at one end and has a nut 58 on the screw threads whereby movement of the rod toward the right (Fig. 1) also effects the movement of the lug 50 in the same direction. The other end of the rod, which is extended outwardly and to the right beyond the lug 52, is provided with an axially-extended slot 60 therein. A cam roller 62 is received in the outer end of said slot and is rotatably connected with the rod 56 by a rivet 64 or the equivalent. A cam bar 66 is extended horizontally through said slot 60 between said roller and the lug 52 and has a tapered or inclined cam face 68 which is adapted to engage the cam roller 62 and has on its other side a flat and straight face 70 which confronts the upstanding outer side of the lug 52. The rear end of said cam bar 66 is pivotally connected with an arm 72 that is reciprocated forwardly and rearwardly under control of the operating handle 48, whereby to effect the contraction and release of the brake band.

A self-seating pressure disc 74 is interposed between the flat side 70 of the cam bar and the lug 52 and is provided with a passage 76 therein through which said rod 56 is loosely received. The outer face 78 of said disc is flat and the flat face 70 of said cam bar is adapted to be seated thereon and slide thereover. The opposite face of said pressure disc is spherical in configuration, as indicated at 80, and is received within a spheroidal recess 82 formed in the outer face of said lug 52 concentric with the rod-passage 54 therethrough. Thus, said pressure disc has a good bearing upon said lug at all times regardless of the angular relation between the two. With this arrangement, regardless of any angular displacement there may be between the cam bar 66 and the lug 52, in the usual operation of the mechanism, the flat face 70 of said cam bar can always be seated upon the flat face 78 of the pressure member 74 and have full bearing across the full diameter of said pressure member since the pressure member will automatically change its position or rock in its spherical seat in the lug 52 to meet changes in the relative positions of the parts. A firm, full bearing of the cam bar on the brake band is thus secured and rapid or undue wear of the parts is thus prevented.

A similar self-seating pressure member 84 is interposed between the nut 58 and the other lug 50 of the brake band to insure good pressure engagement between said lug and the rod 56 regardless of angular variations therebetween.

I claim:

1. Brake mechanism for reversing gearing including a contractile brake band having proximate ends, a rod supported by said brake band and bearing on one of said ends and passed loosely through said other end, a bar-supporting disc surrounding said rod loosely having a spheroidal seat in said other end of said band and an opposing flat outer face, and a cam bar one end of which is supported by said rod having means for moving said rod in one direction and having a flat face which is seated slidably upon the flat face of said disc regardless of angular variation between said cam bar and said other end of said brake band.

2. In a brake mechanism for reversing gearing, the combination of a rotatable brake drum, a brake band contractible about said drum having confronting free ends, a cam bar movable transversely of said free ends for contracting the band having a tapered face which engages a component part of one of said ends and an opposing flat straight face supported by said other end of said band, and a self-seating bar-supporting member interposed between said other end and said flat straight face having a spheroidal rocking seat in said other end, and a flat face which is slidably engaged by said flat straight face of said cam bar regardless of variation of angular relation between said cam bar and said other end of the brake band.

In testimony whereof, I have signed my name to this specification.

WALTER C. WARE.